US006363483B1

(12) United States Patent
Keshav

(10) Patent No.: US 6,363,483 B1
(45) Date of Patent: Mar. 26, 2002

(54) METHODS AND SYSTEMS FOR PERFORMING ARTICLE AUTHENTICATION

(75) Inventor: Srinivasan Keshav, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/333,829

(22) Filed: Nov. 3, 1994

(51) Int. Cl.[7] ........................... H04L 9/00; B42D 15/10

(52) U.S. Cl. ........................... 713/176; 705/57; 283/57; 283/73

(58) Field of Search ..................... 380/23–25; 713/176; 705/57; 382/30; 283/57–59, 73

(56) References Cited

U.S. PATENT DOCUMENTS

| | | | | |
|---|---|---|---|---|
| 5,267,314 A | * 11/1993 | Stambler | ..................... | 380/24 |
| 5,310,036 A | 5/1994 | Hell | ........................... | 194/206 |
| 5,337,358 A | 8/1994 | Axelrod et al. | ............... | 380/23 |
| 5,373,561 A | * 12/1994 | Haber et al. | .............. | 380/23 X |

FOREIGN PATENT DOCUMENTS

| | | | | |
|---|---|---|---|---|
| EP | 0453930 A2 | 10/1991 | ............ | G07D/7/00 |
| EP | 0154972 A2 | 9/1995 | ............ | G07D/7/00 |
| FR | 2377065 | 8/1978 | ............ | G06K/7/10 |

OTHER PUBLICATIONS

Schneier, B., "Untangling Public–Key cryptography," *Dr. Dobb's Journal,* vol. 17, no. 5, May 1992.

"Debating Encryption Standards," *Communication of the ACM,* vol. 35, No. 7, Jul. 1992.

* cited by examiner

*Primary Examiner*—Gilberto Barron, Jr.
(74) *Attorney, Agent, or Firm*—Priest & Goldstein, PLLC

(57) ABSTRACT

Disclosed are methods and systems for authenticating a unique article utilizing a generated unique data signature. The unique data signature is generated by encrypting a received data set representative of a unique identification number fixed to a substantially unforgeable document. The unique data signature is fixed to the unique article or to an optionally generated ownership certificate or the like. The unforgeable document is retained, possibly as the ownership certificate, or the like, or as a part thereof, to thereby authenticate the unique article.

20 Claims, 2 Drawing Sheets

METHODS AND SYSTEMS FOR PERFORMING ARTICLE AUTHENTICATION

TECHNICAL FIELD OF THE INVENTION

The present invention relates in general to security methods and systems, and more particularly to methods and systems for generating and utilizing a unique data signature for authenticating a unique article.

BACKGROUND

Throughout modern life, each person authors, creates, uses, earns, and may even be legally required to carry, a variety of unique articles. A unique article, as used herein, shall mean one or more of the following, but is not limited to, any singular, original, particular, lone, sole, and/or genuine item, instrument or document having a surface, which may include a substrate, to which data, intelligence, facts, expressions, works of authorship, or other information may be fixed. Fixed, as used herein, shall mean one or more of the following, but is not limited to, attached, imprinted, adhered, carved, painted, penned, etched, mounted, inserted, deposited, scratched, sculpted, or otherwise imaged, arranged, placed, molded, or positioned.

In many instances, the need arises to conveniently, rapidly, and credibly verify the authenticity of a unique article under consideration. To determine if the particular unique article is authentic, it is often necessary to determine whether the party claiming ownership of the article is in rightful possession, and that the article is in fact unique. For instance, assume that a party claiming to be the owner of a unique work of art, such as, a painting or sculpture, for example, and a prospective purchaser of same enter into a sales agreement. A diligent purchaser will attempt to verify the authenticity of the work of art, as well as, the rightful possession of the selling party.

Unfortunately, many unique articles, such as original paintings, sculptures, antiques, artifacts, etc. are often copied, duplicated or reproduced, either manually or with the assistance of a conventional processing system based copying or image reproduction device. Further, registration of unique articles, coupled with the subsequent issuance of certificates of ownership, verification certificates, deeds, title papers, and the like are ineffective, as these documents are easily forged, counterfeited, simulated, etc. Thus, the issuance of certificates of ownership and other similar methods of authentication are brittle, meaning that once the certificate of ownership, verification certificate, deed, title paper, or the like is circumvented, the limited scope of protection previously afforded is gone.

SUMMARY OF THE INVENTION

In accordance with the principles of the present invention methods and systems are provided for creating, and subsequently verifying, the authenticity of a unique article. Preferably, this is accomplished through the utilization of a data set representative of a unique identification number. The unique identification number is preferably fixed to a substantially unforgeable document. The unique identification number is also preferably encrypted in accordance with conventional cryptography techniques.

One method for authenticating a unique article in accordance with the principles of the present invention concerns initially receiving a data set which includes at least one data subset, wherein a first data subset is representative of a unique identification number fixed to a surface of a substantially unforgeable document. The input data set is then encrypted to generate a unique data signature, preferably utilizing a public-private key cryptography process. The unique data signature is then fixed to the unique article and/or a verification certificate, to thereby authenticate the unique article.

A method for authenticating an original work of authorship in accordance with the principles of the present invention concerns receiving both a first and a second data set; encrypting the first data set, and preferably at least a portion of the second data set, to generate a unique data signature; and fixing the unique data signature to a surface of the original work of authorship and/or a verification certificate. The first data set is preferably representative of a unique identification number, or serial number, of a currency note, and the second data set preferably includes at least one textual data subset. Preferably, the encryption process utilizes public-private key cryptography to generate the unique data signature.

One system for authenticating a unique article in accordance with the principles of the present invention concerns a processing system including both a receiving means and a processing means. The receiving means operates to receive an input data, set including at least one data subset, wherein a first data subset represents a unique identification number fixed to a substantially unforgeable document. The processing means generates a unique data signature, preferably by encrypting at least a portion of the input data set to generate the unique data signature. The encryption processes preferably includes the utilization of public-private key cryptography.

One embodiment for using and/or distributing the present invention is as software stored to a storage medium. The software includes a plurality of computer instructions for controlling at least one processing unit for generating a unique data signature for authenticating a unique article in accordance with the principles of the present invention. The storage mediums utilized may include, but are not limited to, magnetic, optical, and semiconductor chip. Alternate preferred embodiments of the present invention may also be implemented in firmware or hardware, to name two other examples.

BRIEF DESCRIPTION OF THE DRAWINGS

For a more complete understanding of the present invention, and the advantages thereof, reference is made to the following descriptions taken in conjunction with the accompanying drawings in which like numbers designate like parts, and in which.

DETAILED DESCRIPTION OF THE INVENTION

The principles of the present invention, and the features and advantages thereof, are better understood by referring to the illustrated embodiment depicted in FIGS. 1–4 of the drawings.

Figure 1:
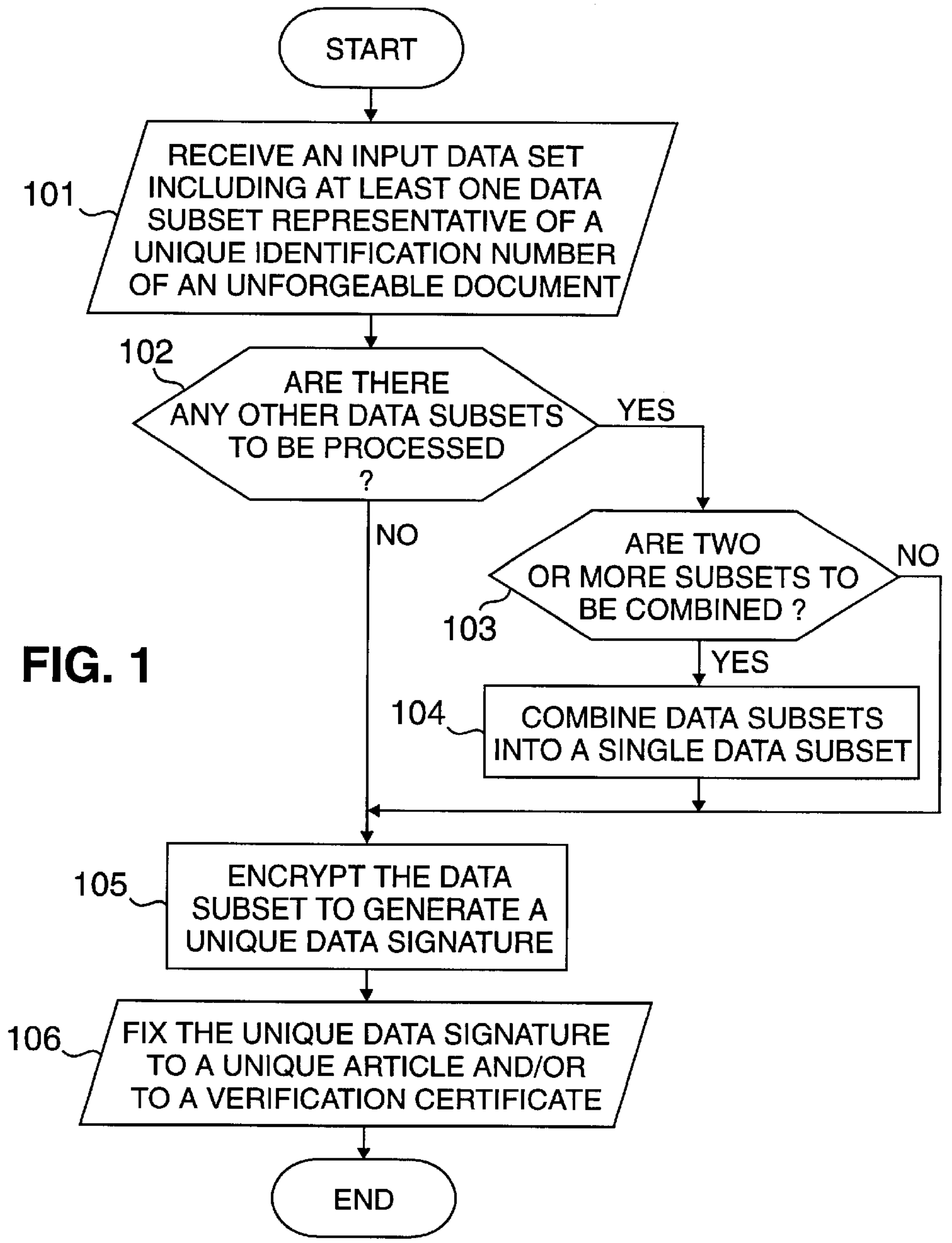
FIG. 1 illustrates a flow diagram of a method of security for creating, and subsequently verifying, the authenticity of a unique article.

FIG. 1 illustrates a flow diagram of one preferred method of security for creating, and subsequently verifying, the authenticity of a unique article, such as a work of authorship, like a painting or sculpture, as examples. A work of authorship more particularly includes, but is not limited to, original literary works, such as manuscripts, for example, as well as, unique pictorial, graphic and sculptural works. Preferably, the method steps herein illustrated are programmed in a suitable high-level programming language, compiled into object code, and subsequently loaded onto a processing system, such as a personal computer, for utilization. One preferred processing system, illustrated in cooperation with conventional scanning and certificate issuance devices, utilized in accordance with the principles of the present invention, will be discussed in detail with reference to FIGS. 3 and 4. Alternatively, the principles of the present invention may be embodied within any suitable arrangement of firmware or hardware, as previously introduced.

Figure 2:
FIG. 2 illustrates an artist's rendition of a one dollar bill having a unique serial number fixed thereto.

Upon entering the START block, the process begins. An input data set having at least one data subset is received, input/output block 101. Preferably, the data subset is representative of a unique identification number from a substantially unforgeable document. A unique identification number more particularly is any string of characters, including numbers and/or letters, or other cognizable symbols, which operates to uniquely classify, describe, name, confirm, substantiate and/or identify the substantially unforgeable document, such as, for example, a serial number. A substantially unforgeable document more particularly is any unique certificate, charter, license, chronicle, record, deed, draft, bill, or the like, which has been produced in a manner to prevent, inhibit, discourage, etc. the fraudulent reproduction or alteration of same with an intent to prejudice the rights of another, such as, for example, a currency note or other similar instrument. FIG. 2 illustrates an artist's rendition of a one dollar bill 200 having a unique serial number 201 fixed thereto.

In alternate preferred embodiments, the input data set may also include other data subsets, such as, for example, one or more textual data subsets. Such textual data subsets may include, but are not limited to, for example, one or more of the following, the name of the creator of the unique article, such as the author of an original work of authorship; a creation date of the unique article; the name or title of the unique article; the name of the country of origin, if the substantially unforgeable document is a currency note; a serial number of a verification certificate which may be produced as part of the authentication process; a description of the verification certificate, if produced; etc. It should be noted that, when the input data set is comprised of more than one data subset, the data subsets need not be received simultaneously. Accordingly, an aspect of the present invention is that data set and/or subset collection need not occur coincidentally.

A determination is preferably made whether more than one data subset exists, decisional block 102. If more than one data subset exists, YES branch of decisional block 102, then if the two or more data subsets are to be combined, YES branch of decisional block 103, then the data subsets are preferably concatenated together, interleaved, or otherwise combined to form a single data subset, processing block 104. The single data subset produced in block 104, or the single data subset representative of the unique identification number, NO branches of decisional blocks 102 and 103, is encrypted to generate a unique data signature, processing block 105.

Cryptographic processes typically transform data through the use of two basic elements, a cryptographic algorithm and keys. The cryptographic algorithm generally includes procedures for encoding and decoding data sets and subsets. These encoding and decoding procedures may be identical or may consist of the same steps performed in reverse order. The keys, which are often selected by a user, generally consist of a sequence of characters, such as letters and/or numbers, and/or other cognizable symbols, which are used by the cryptographic process to encode and decode the data sets and subsets. One conventional cryptography process is the single key process. In accordance with this process, a single key is used for both data encoding and decoding. In order to ensure protection, however, the key must be kept secret. This is the Data Encryption Standard ("DES") single key technique, a standard accepted by the National Bureau of Standards, and which is accordingly known. Another conventional cryptography process is a public-private key process. This preferred process utilizes two keys, instead of using a single key for both data encoding and decoding. One key is used to encode the data sets and subsets, while the other is used to decode the data sets and subsets. One key typically is made public and one key is kept private. If the public key is used to encode the data sets and subsets, then the private key is used to decode the data sets and subsets, and vice versa. An aspect in accordance with this process therefore is the substantially impossible deduction of the private key from the public key and known encrypted text, and vise versa. Preferably, the unique data signature is generated utilizing a public-private key cryptography process, the techniques for performing such are also known. Public-private key cryptography is more fully discussed in "Untangling Public-Key Cryptography," by B. Schneier, *Dr. Dobb's Journal*, vol. 17, no. 5, May 1992; "Debating Encryption Standards," *Communications of the ACM*, vol. 35, no. 7, July 1992; and "The Idea Encryption Algorithm," by B. Schneier, *Dr. Dobb's Journal*, vol. 18, no. 13, December 1993, which are incorporated herein by reference. The unique data signature is then fixed to the unique article and/or to an optionally produced verification certificate, thereby authenticating the unique article, input/output block 106. Preferably, the substantially unforgeable document is attached to a certificate of ownership, or the like. Regardless, the substantially unforgeable document must be retained.

Note that the data encryption and decryption techniques discussed herein are presented for illustrative purposes only, and although the public-private key process is preferred, any suitably arranged cryptography techniques in accordance with the principles of the present invention may be substituted for, or utilized in addition to, those described herein.

Figure 3:
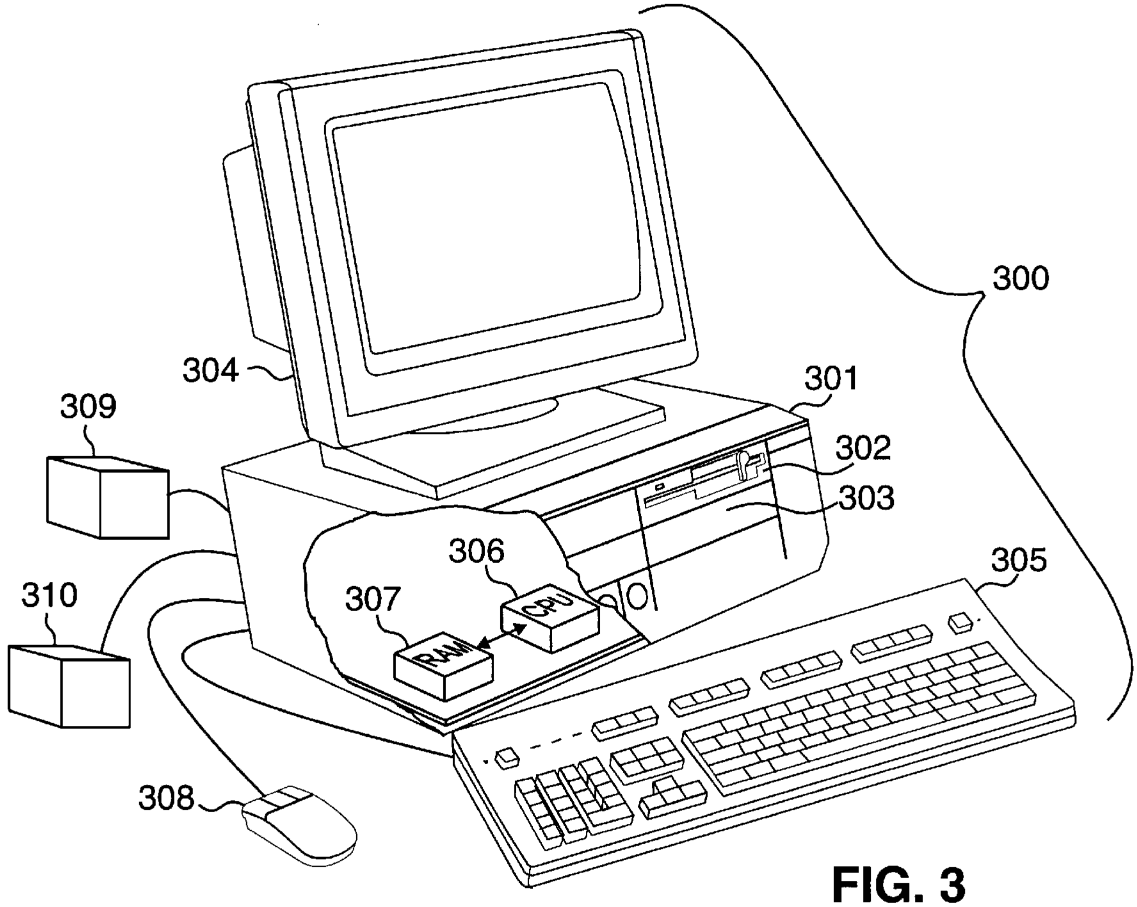
FIG. 3 illustrates an isometric view of a personal computer, in cooperation with conventional scanning and certificate issuance devices, in accordance with the principles of the present invention.

FIG. 3 illustrates an isometric view of a personal computer 300, optionally coupled with conventional scanning and certificate issuance devices 309 and 310, in accordance with the principles of the present invention. Personal computer 300 is comprised of a hardware casing 301 (illustrated having a cut-away view), a monitor 304, a keyboard 305 and a mouse 308. Note that the monitor 304, and the keyboard 305 and the mouse 308 may be replaced by, or combined with, other suitably arranged output and input devices, respectively. Hardware casing 301 includes both a floppy disk drive 302 and a hard disk drive 303. Floppy disk drive 302 is operable to receive, read and write to external disks, while hard disk drive 303 is operable to provide fast access data storage and retrieval. In one preferred embodiment, a unique identification number, such as the serial number 201 fixed to the dollar bill 200 illustrated in FIG. 2, is scanned utilizing the scanning device 309. In an alternate preferred embodiment, the unique identification number from the substantially unforgeable document is input utilizing the keyboard 305. In other preferred embodiments, the unique identification number is received via an input/output drive and/or a data port. Accordingly, although only floppy disk drive 302 is illustrated, personal computer 300 may be equipped with any suitably arranged structure for receiving and/or transmitting data, including, for example, tape and compact disc drives, and serial and parallel data ports. Within the cut away portion of hardware casing 301 is a processing unit 306, coupled with a memory storage device 307, which in the illustrated embodiment is a random access memory ("RAM"). Although personal computer 300 is shown having a single processing unit 306, personal computer 300 may be equipped with a plurality processing units 306 operable to cooperatively carry out the principles of the present invention. Similarly, although personal computer 300 is shown having the single hard disk drive 303 and memory storage device 307, personal computer 300 may be equipped with any suitably arranged memory storage device, or plurality thereof. Further, although personal computer 300 is utilized to illustrate a single embodiment of a processing system, the principles of the present invention may be implemented within any processing system having at least one processing unit, including, but not limited to, sophisticated calculators and hand held, mini, main frame and super computers, including RISC and parallel processing architectures, as well as within processing system network combinations of the foregoing.

Once processing system 300 has generated the unique data signature, the conventional certificate issuance device 310 may optionally be utilized to generate a certificate of ownership, to which the data subset representation of the unique identification number and/or the unique data signature may be fixed. In one preferred embodiment, the substantially unforgeable document is also fixed to the certificate of ownership. Regardless, the substantially unforgeable document must be retained for subsequent authentication.

In another alternate embodiment, the scanning and certificate issuance devices 309 and 310 are combined, or alternately cooperate, such that the substantially unforgeable document is received, the unique identification number is scanned, and in conjunction with the generation of the unique data signature, a verification or ownership certificate, or the like, is produced which includes the substantially unforgeable document. In other words, the substantially unforgeable document is inserted into, enclosed within, fixed to or otherwise made part of the verification or ownership certificate.

Figure 4:
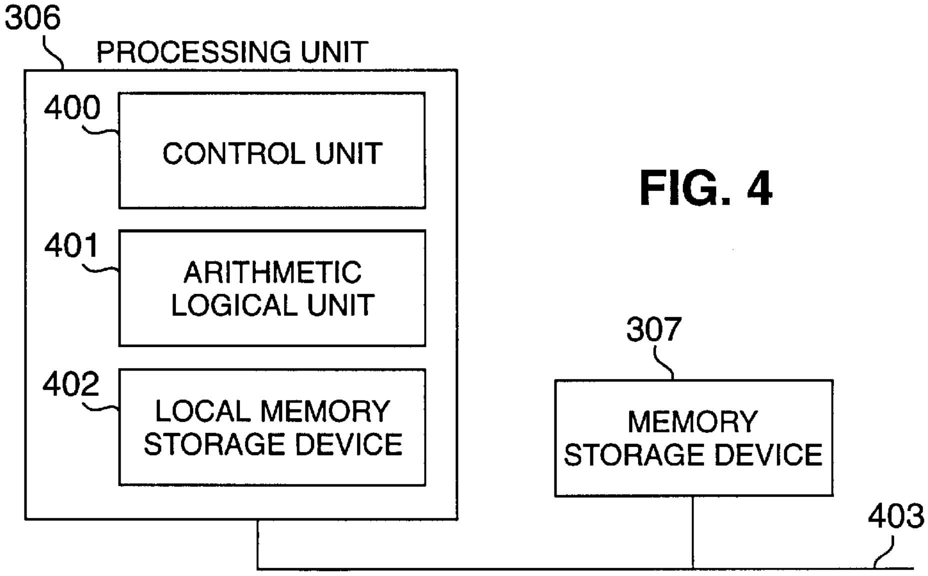
FIG. 4 illustrates a block diagram of a microprocessing system, including a single processing unit and a single memory storage device, which may be utilized in conjunction with the personal computer in FIG. 3.

FIG. 4 illustrates a block diagram of one microprocessing system, including a processing unit and a memory storage device, which may be utilized in conjunction with personal computer 300. The microprocessing system includes a single processing unit 106 coupled via data bus 403 with a memory storage device, such as RAM 307, for example. Memory storage device 307 is operable to store one or more processing system instructions which processing unit 306 is operable to retrieve, interpret and execute. Illustrative processing unit 306 includes a control unit 400, an arithmetic logic unit ("ALU") 401, and a local memory storage device 402, such as, for example, stackable cache or a plurality of registers. Control unit 400 is operable to fetch the instructions from memory storage device 307. ALU 401 is operable to perform a plurality of operations, including addition and Boolean AND needed to carry out instructions. Local memory storage device 402 is operable to provide local high speed storage used for storing temporary results and control information.

Although the present invention and its advantages have been described in detail, it should be understood that various changes, substitutions and alterations can be made herein without departing from the spirit and scope of the invention.

I claim:

1. A method for authenticating a unique article by creating a unique data signature for the unique article, said method comprising the steps of:

receiving a data set including at least one data subset wherein a first data subset is representative of a unique identification number fixed to a surface of a substantially unforgeable document;

encrypting said input data set to generate a unique data signature and fixing said unique data signature to at least one of said unique article and a verification certificate, to thereby authenticate said unique article; and utilizing the substantially unforgeable document and said unique data signature together for subsequent proof of authenticity of the unique article.

2. The method as set forth in claim 1 further including the step of retaining and attaching said substantially unforgeable document to said verification certificate.

3. The method as set forth in claim 1 wherein said substantially unforgeable document is a currency note including a serial number, and said method further includes the step of scanning said unique serial number.

4. The method as set forth in claim 1 wherein said encryption step further includes the step of utilizing a public-private key cryptography algorithm.

5. The method as set forth in claim 1 further including the step of combining a second data subset with said first data subset, said second data subset including textual data.

6. The method as set forth in claim 5 further including the step of fixing at least a portion of said second data subset to said verification certificate.

7. The method as set forth in claim 5 further including the step of fixing at least a portion of said second data subset to said unique article.

8. A method for authenticating an original work of authorship by creating a unique data signature for the original work of authorship, said method comprising the steps of:

receiving a first data set representative of a unique identification number of a currency note and a second data set including at least one textual data subset;

encrypting said first data set and at least a portion of said second data set utilizing public-private key cryptography to generate a unique data signature;

fixing said unique data signature to a surface of at least one of said original work of authorship and a verification certificate; and utilizing the currency note and said unique data signature together for subsequent proof of authenticity of the original work of authorship.

9. The method as set forth in claim 8 wherein said encryption step is preceded by the step of combining said first and second data sets.

10. The method as set forth in claim 8 further including the step of retaining and attaching said currency note to said verification certificate.

11. The method as set forth in claim 8 wherein said receiving step is preceded by the step of reading said unique identification number from a surface of said currency note.

12. The method as set forth in claim 8 wherein said second data set includes at least one textual data subset selected from the group consisting of:

a name of the author of said original work of authorship;

a creation date of said original work of authorship;

a title of said original work of authorship;

a name of the country of origin of said currency note;

an identification number of a verification certificate; and a description of said verification certificate.

13. A processing system for authenticating a unique article, said processing system comprising:

means for receiving an output data set including at least one data subset, wherein a first data subset represents a unique identification number fixed to a substantially unforgeable document separate from the unique article to be authenticated; and processing means for generating a unique data signature, said processing means operable to encrypt at least a portion of said input data set to generate s aid unique data signature.

14. The processing system as set forth in claim 13 further comprising at least one memory means for storing a plurality of processing system instructions and wherein said processing means is further operable to receive and execute one or more processing system instructions, said processing system instructions directing said processing means to generate said unique data signature.

15. The processing system as set forth in claim 13 wherein said processing means is further operable to utilize a public-private key cryptography algorithm.

16. The processing system as set forth in claim 13 wherein said input data set includes a second data subset and said processing means is further operable to combine said first and second data subsets.

17. The processing system as set forth in claim 13 further comprising attaching means for fixing said unique data signature to said unique article.

18. The processing system as set forth in claim 13 further comprising producing means for generating an ownership certificate.

19. The processing system as set forth in claim 18 further comprising attaching means for fixing said unique data signature to said ownership certificate.

20. The processing system as set forth in claim 13 wherein said substantially unforgeable document is a currency note and said receiving means further includes means for scanning a serial number fixed to a surface of said currency note.

* * * * *